United States Patent Office 3,164,036
Patented Jan. 5, 1965

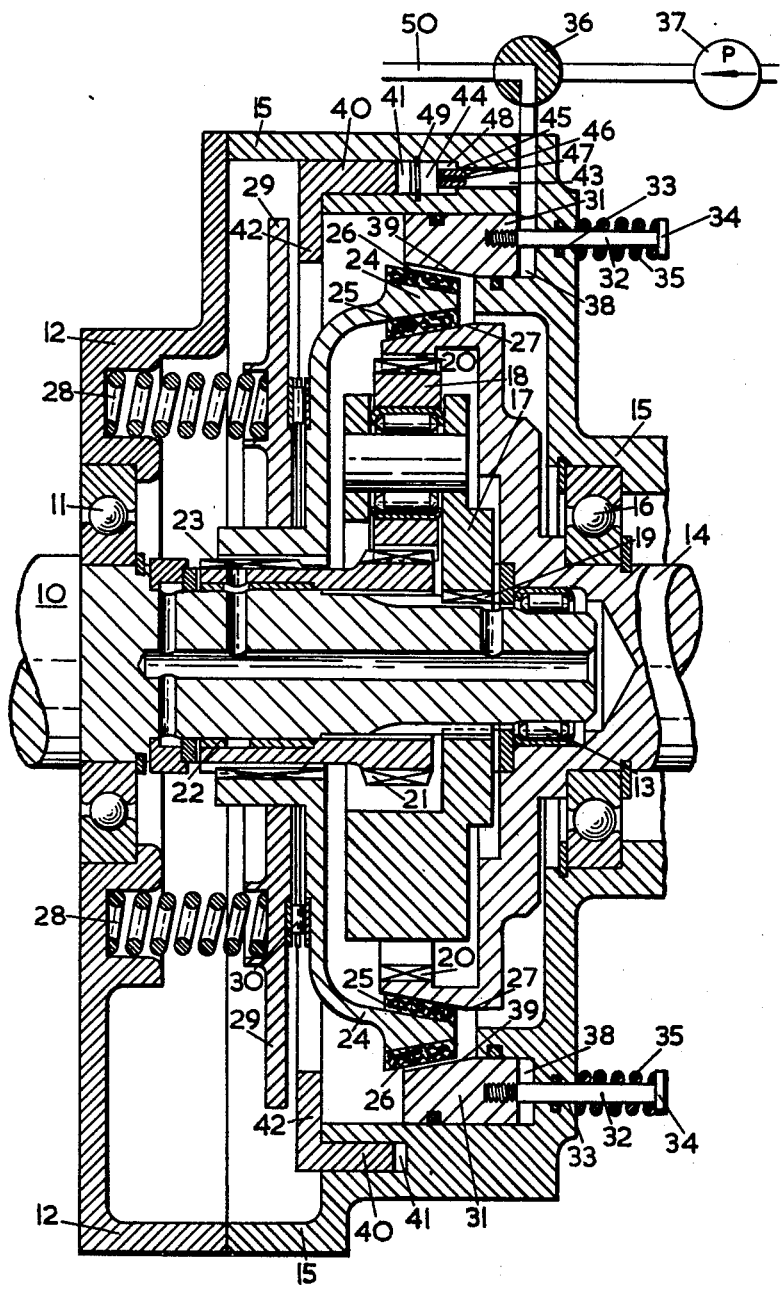

3,164,036
PLANETARY DRIVE TRANSMISSION DEVICE
Alan S. Lamburn, Kencott, via Lechlade, and Randle L. Abbott, Leamington Spa, England, assignors to Axel Wickman Transmissions Limited, Warwickshire, England
Filed May 9, 1963, Ser. No. 279,281
Claims priority, application Great Britain May 17, 1962
8 Claims. (Cl. 74—781)

The invention relates to a planetary drive transmission device, for optionally providing a drive at unit, or another ratio, of the kind including a power input shaft, a power output shaft, a sun wheel element, an annulus wheel element, a planet carrier element supporting at least one planet wheel drivingly interconnecting the sun wheel element and the annulus wheel element, one of said elements being drivingly connected to the power input shaft, another of said elements being drivingly connected to the power output shaft, the remaining said element being rotatively fast with an axially-movable friction engaging means which is adapted optionally to engage a coacting surface rotatively fast with one of said shafts for providing a drive between the shafts at unit ratio, or to engage a coacting surface on a non-rotary member for providing a drive between the shafts at the said another ratio, the axially-movable friction engaging means adapted to engage one of the said coacting surfaces under the influence of a bias to provide a drive at one of said ratios, and a fluid-pressure-operated means adapted to move the axially-movable friction engaging means against its bias to disengage the said one coacting surface and to engage the other said coacting surface thereby to provide a drive at the other of said ratios.

A planetary drive transmission device of the kind set forth is particularly, but not exclusively, adapted for use in the drive transmission system of a motor road vehicle and, in the case where the sun wheel element or the annulus wheel element is rotatively fast with the axially-movable friction engaging means, is suitable for use either as an overdrive or as an underdrive. An object of the invention is to provide an overdrive or an underdrive which will allow the prime mover of the vehicle to accelerate naturally during a change down in ratio, that is a change from the planetary ratio to unit ratio in an overdrive or a change from unit ratio to the planetary ratio in an underdrive.

According to the invention a planetary drive transmission device, of the kind set forth, is provided with a baulking member which, when the fluid-pressure-operated means is energised to move the axially-movable friction engaging means to engage the said other ratio, is moved into a position in which it will oppose the return movement of the aixally-movable friction engaging means to engage the said one ratio, the baulking member being arranged, when the fluid-pressure-operated means is de-energised, to exhaust its operating fluid through a restrictor thereby to cause the baulking member to delay the engagement of the said one ratio. In this manner the baulking member controls the time taken for the drive to be transferred from the said other ratio to the said one ratio and may be used to prevent the generation of undue shocks which could be caused by a sudden engagement of the axially-movable friction engaging means with the coacting surface providing the said one ratio.

According to one feature the baulking member may be arranged to be connected by a common passage optionally to a supply of operating fluid or to exhaust, and the restrictor is of a one-way-acting type and is arranged in the said common passage so that it will only delay the exhaust of operating fluid from the baulking member.

According to a further feature a valve may be provided for simultaneously connecting the baulking member and the fluid-pressure-operated means optionally to a supply of operating fluid or to exhaust.

In the case where the axially-movable friction engaging means is biased towards both of the coacting surfaces and one of the coacting surfaces is axially-stationary for resisting the bias of the axially-movable friction engaging means when said one ratio is engaged and the other coacting surface is axially-movable by the fluid-pressure-operated means against the bias of the axially-movable friction engaging means to disengage the said one ratio whilst engaging the other ratio, the restrictor may, according to another feature, be of such a size that, when the fluid-pressure-operated means is de-energised, the movement of the axially-movable friction engaging means will be delayed to such an extent that it will disengage said other ratio completely before starting to engage said one ratio. In this manner the normal operation of the axially-movable friction engaging means, in which the drive is progressively transferred from the said other coacting surface to the said one coacting surface, is modified so that the disengagement of the said other ratio is distinct from the engagement of the said one ratio.

In the case where the planet carrier element is drivingly connected to one of said shafts and the device constitutes an overdrive for a motor road vehicle, the said other ratio is preferably the planetary overdrive ratio and the said one ratio is unit ratio, and the restrictor is of such a size that, when the fluid-pressure-operated means is de-energised, the movement of the axially-movable friction engaging means will be delayed to such an extent that it will allow sufficient time between the complete disengagement of the planetary overdrive ratio and the initiation of engagement of unit ratio for the rotational speed of the axially-movable friction engaging means to be increased, by the natural acceleration of the prime mover of the motor road vehicle under the decreased load, to substantially the same value as that of the axially-stationary coacting member. In this manner a change down in ratio is made very smoothly as there is substantially no relative rotation between the axially-movable friction engaging means and the axially-stationary coacting member when the engagement of unit ratio is initiated. Similarly, in the case where such a device constitutes an underdrive, the said other ratio is preferably unit ratio and the said one ratio is the planetary underdrive ratio, and the restrictor is of such a size that, when the fluid-pressure-operated means is de-energised, the movement of the axially-movable friction engaging means will be delayed to such an extent that it will allow sufficient time between the complete disengagement of unit ratio and the initiation of engagement of the planetary underdrive ratio for the rotational speed of the axially-movable friction engaging means to be decreased substantially to zero by the natural acceleration of the prime mover of the motor road vehicle under the decreased load.

One embodiment of the invention is illustrated, by way of example, in the accompanying drawing which is an axial section through a planetary drive transmission device forming an overdrive for a motor road vehicle.

In the drawing, a power input shaft 10 is supported by a bearing 11 from a casing member 12 and by a needle roller bearing 13 from an aligned power output shaft 14 which is supported from a casing member 15 by a bearing 16. A carrier 17, for a planet wheel 18, is held rotatively fast with the power input shaft 10 by splines 19. The planet wheel 18 meshes with an annulus wheel 20, formed integral with the power output shaft 14, and with a sun wheel 21 freely supported on the power input shaft 10 by a journal bearing 22. The sun wheel 21 has a splined connection 23 with a friction engaging means 24 carrying convergent inner and outer frusto-conical friction pads 25, 26 respectively. The friction engaging means 24 can be slid axially on the splines 23 for the inner friction pad 25 to engage over a coacting clutch surface 27 of the annulus wheel 20, thereby to provide a drive between power input shaft 10 and power output shaft 14 at unit ratio.

A plurality of axially-directed compression springs 28 are arranged in a circle about the common axis of the power input and power output shafts and react between the casing member 12 and a radially-extending flange 29 which bears on the axially-movable friction engaging means 24 through a thrust race 30 to engage unit ratio.

An annular piston 31, constituting a fluid-pressure-operated means, is arranged radially outside the axially-movable friction engaging means 24 and is prevented from rotation by axially-extending pegs 32 which extend sealingly through bores 33 in casing member 15 and are provided with heads 34. A compression coil spring 35 is arranged over each peg 32 and reacts between casing member 15 and the respective head 34 to bias the annular piston 31 to the non-operative position shown in the drawing. When the planetary overdrive ratio is to be selected, a control valve 36 is actuated to convey pressurised fluid from a pump 37 to cylinder 38 of the annular piston 31. The force exerted by piston 31 is arranged to be sufficient for causing engagement between a coacting brake surface 39 of the piston 31 and outer friction pad 26, and for moving axially-movable friction engaging means 24 against the bias of springs 28 thereby to disengage inner friction pad 25 from coacting clutch surface 27. The gear change from unit ratio to planetary overdrive ratio will be smooth because the reaction between the axially-movable friction engaging means 24 and the coacting clutch surface 27 is smoothly transferred to the coacting brake surface 39. The force of engagement of the outer friction pad 26 with coacting brake surface 39 is equal to the force exerted by springs 28 on flange 29 and is dependent on the rating of springs 28 and on the axial position of axially-movable friction engaging means 24, which axial position is limited by the position that piston 31 occupies when the springs 35 are solid.

The drive transmission device described up to this point is of known construction and operation.

In accordance with the invention a baulking piston 40 is supported for axial movement by a cylinder 41 formed in casing member 15 and has an inwardly-directed annular flange 42 adapted to abut radially-extending flange 29. Cylinder 41 is connected by a passage 43 to the control valve 36. A portion 44 of passage 43 is made of increased diameter for housing a one-way-acting restrictor comprising a spool 45 having a nose portion 46 adapted to extend sealingly into passage 43, an axially-extending orifice 47 and a number of spaced radial fins 48 for supporting the spool 45 in the portion 44. In operation, when fluid passes from passage 43 to the cylinder 41, the pressure of the fluid acts on nose portion 46 and urges spool 45 along portion 44 to abut a retaining ring 49. Thus, the fluid may pass unrestricted between the radial fins 48. However, when fluid passes from the cylinder 41 to the passage 43, the spool 45 is moved by the fluid along portion 44 until nose portion 46 sealingly engages passage 43 whereupon the fluid is constrained to pass through orifice 47 and is accordingly restricted.

When control valve 36 is actuated to connect cylinder 38 to be supplied with operating fluid from the pump 37 for disengaging unit ratio and engaging the planetary overdrive ratio, operating fluid passes through passage 43 into cylinder 41 and causes flange 42 to abut radially-extending flange 29 in the position it occupies when the planetary overdrive ratio is engaged. On actuating valve 36 to connect cylinder 38 to exhaust 50, springs 35 cause piston 31 to withdraw coacting brake surface 39 from outer friction pad 26 thus disengaging the planetary overdrive ratio, but the restriction caused by orifice 47 causes flange 42 to delay the engagement of unit ratio by temporarily preventing the axial force generated by springs 28 on radially-extending flange 29 from being applied to the axially-movable friction engaging means 24.

The extent to which flange 42 delays the engagement of unit ratio is determined by the restrictive value of the orifice 47, and the duration of the delay can be modified to give different results by varying the restrictive value. Thus, the restrictive value of the orifice may be arranged so that piston 31 completely disengages coacting brake surface 39 and outer friction pad 26 before the inner friction pad 25 starts to engage coacting clutch surface 27. It will be appreciated that, by decreasing the restrictive value of the orifice, the planetary overdrive ratio will be only partially disengaged before the initiation of the engagement of unit ratio and that, by increasing the restrictive value of the orifice, a delay will be created between the complete disengagement of the planetary overdrive ratio and the initiation of the engagement of unit ratio and a free-wheeling condition will exist during this delay.

When a change down in ratio is made with the overdrive illustrated, the axially-movable friction engaging means 24 has to accelerate from rest to the speed of the power output shaft 14 before unit ratio is fully engaged. Assuming that the speed of the power output shaft 14 is not altered during this change of gear ratio, the speed of the prime mover driving the power input shaft 10 will have to increase from the value corresponding with the overdrive ratio to a value corresponding wtih unit ratio before the latter is fully engaged. In accordance with one aspect of this invention the restrictive value of the orifice 47 is arranged to be such that it will allow a free-wheeling condition for a short period between the complete disengagement of the overdrive ratio and the initiation of the engagement of unit ratio. The duration of the free-wheeling condition being such as to allow the speed of the prime mover to increase, due to the no-load condition existing during free-wheeling, to a value substantially corresponding with unit ratio; in this manner the axially-movable friction engaging means 24 will be accelerated, by the prime mover, to substantially the same speed as the power output shaft 14 before the initiation of the engagement of unit ratio. With this arrangement shocks, which could otherwise be caused by a sudden change of ratio, will be prevented and the life of friction pads 25 and 26 will be increased.

Although the invention has been specifically described with reference to an overdrive it can also be applied to an underdrive. Thus, if shaft 14 in the drawing were made the input shaft and shaft 10 the output shaft, the planetary ratio would provide an underdrive. However, if this underdrive is to allow the prime mover of the vehicle to accelerate naturally during a change down in ratio, it should be noted that the ratio selecting portion of the device would have to be slightly modified so that the piston 31 would cause engagement of unit ratio, the springs 28 would cause engagement of the planetary ratio, and the baulking piston 40 would delay the engagement of the planetary underdrive ratio.

The invention may be used for purposes other than allowing the prime mover of a vehicle to accelerate naturally during a change down in ratio, the restrictive value of the orifice 47 being adjusted so that the baulking piston 40 has the required effect. Although the invention has been described with specific reference to planetary drive transmission devices of the type in which the sun wheel element 21 is rotatively fast with the axially-movable friction engaging means 24, it may be applied to any planetary drive transmission device of the kind set forth. However, it should be borne in mind that the type of planetary drive transmission device, in which the planet carrier element 17 is rotatively fast with the axially-movable friction engaging means 24, gives unit ratio and a reverse ratio.

Although frusto-conical friction pads 25, 26 have been shown in the drawing, other types of pad may be used provided that they may be operatively-supported by an axially-movable friction engaging means 24.

What we claim as our invention and desire to secure by Letters Patent of the United States is:

1. A planetary drive transmission device, for optionally providing a drive at unit or another ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said another ratio, a bias arranged to urge said axially-movable friction engaging means into engagement with one of said coacting surfaces to provide a drive at one of said ratios, a fluid-pressure-operated means operable to move said axially-movable friction engaging means against said bias to disengage said one coacting surface and to engage the other said coacting surface to provide a drive at the other said ratio, a fluid-pressure-operated baulking member operable to coact with said axially-movable friction engaging means to prevent the engagement of said axially-movable friction engaging means and said one coacting surface, a body defining an exhaust passage, a fluid-flow restrictor arranged in said exhaust passage, and valve means operable to connect said fluid-pressure-operated baulking member to said exhaust passage when said fluid-pressure-operated means is de-energised whereby said fluid-pressure-operated baulking member will delay the engagement of said axially-movable friction engaging means and said one coacting surface.

2. A planetary drive transmission device, for optionally providing a drive at unit or another ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said another ratio, a bias arranged to urge said axially-movable friction engaging means into engagement with one of said coacting surfaces to provide a drive at one of said ratios, a fluid-pressure-operated means operable to move said axially-movable friction engaging means against said bias to disengage said one coacting surface and to engage the other said coacting surface to provide a drive at the other said ratio, a fluid-pressure-operated baulking member operable to coact with said axially-movable friction engaging means to prevent the engagement of said axially-movable friction engaging means and said one coacting surface, a body defining a passage, said passage communicating with said fluid-pressure-operated baulking member, a one-way-acting fluid-flow restrictor arranged in said passage, and valve means operable when said fluid-pressure-operated means is de-energised to connect said passage to exhaust, said one-way-acting restrictor arranged so that it will only restrict the exhaust of fluid from said passage whereby said fluid-pressure-operated baulking member will delay the engagement of said axially-movable friction engaging means and said one coacting surface.

3. A planetary drive transmission device, for optionally providing a drive at unit or another ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said another ratio, a bias arranged to urge said axially-movable friction engaging means into engagement with one of said coacting surfaces to provide a drive at one of said ratios, a fluid-pressure-operated means operable to move said axially-movable friction engaging means against said bias to disengage said one coacting surface and to engage the other said coacting surface to provide a drive at the other said ratio, a fluid-pressure-operated baulking member operable to coact with said axially-movable friction engaging means to prevent the engagement of said axially-movable friction engaging means and said one coacting surface, a valve means, a body defining a first passage communicating with said fluid-pressure-operated means and a second passage communicating with said fluid-pressure-operated baulking member, said passages communicating with each other and with said valve means, and a one-way-acting fluid-flow restrictor arranged in said second passage, said valve means operable to connect said passages optionally to exhaust or to supply, and said one-way-acting restrictor arranged so that it will only restrict the exhaust of fluid from said second passage whereby, when said valve means is operated to de-energise said fluid-pressure-operated means, said fluid-pressure-operated baulking member will delay the engagement of said axially-movable friction engaging means and said one coacting surface.

4. A planetary drive transmission device, for optionally providing a drive at unit or another ratio, comprising a power input shaft, apower output shaft, an axially-movable friction engaging means, a sun wheel element, an annulus wheel element, a plane wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said another ratio, a bias arranged to urge said axially-movable friction engaging means towards both of said coacting surfaces, means adapted to hold one of said members axially-stationary, said axially-stationary member adapted to resist the action of said bias on said axially-movable friction engaging means to provide a drive at one of said ratios, means arranged to allow axial movement of the other said member, a fluid-pressure-operated means operable to move said other member axially into engagement with said axially-movable friction engaging means whereby to move said axially-movable friction engaging means against said bias to disengage said one coacting surface and to engage the other said coacting surface to provide a drive at the other said ratio, a fluid-pressure-operated baulking member operable to coact with said axially-movable friction engaging means to prevent the engagement of said axially-movable friction engaging means and said one coacting surface, a body defining an exhaust passage, a fluid-flow restrictor arranged in said exhaust passage, and valve means operable to connect said fluid-pressure-operated baulking member to said exhaust passage when said fluid-pressure-operated means is de-energized whereby said fluid-pressure-operated baulking member will delay the engagement of said axially-movable friction engaging means and said one coacting surface.

5. A planetary drive transmission device, for optionally providing a drive at unit or another ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said another ratio, a bias arranged to urge said axially-movable friction engaging means towards both of said coacting surfaces, means adapted to hold one of said members axially-stationary, said axially-stationary member adapted to resist the action of said bias on said axially-movable friction engaging means to provide a drive at one of said ratios, means arranged to allow axial movement of the other said member, a fluid-pressure-operated means operable to move said other member axially into engagement with said axially-movable friction engaging means whereby to move said axially-movable friction engaging means against said bias to disengage said one coacting surface and to engage the other said coacting surface to provide a drive at the other said ratio, a fluid-pressure-operated baulking member operable to coact with said axially-movable friction engaging means to prevent the engagement of said axially-movable friction engaging means and said one coacting surface, a body defining an exhust passage, a fluid-flow restrictor arranged in said exhaust passage, and valve means operable to connect said fluid-pressure-operated baulking member to said exhaust passage when said fluid-pressure-operated means is de-energised whereby said fluid-pressure-operated baulking member will delay the initiation of engagement of said axially-movable friction engaging means and said one coacting surface until after the said axially-movable friction engaging means has completely disengaged the said other coacting surface.

6. A planetary overdrive transmission device, for optionally providing a drive at unit or the planetary overdrive ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, said planet carrier element being one of said elements that is connected by said driving means to one of said shafts, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said planetary overdrive ratio, a bias arranged to urge said axially-movable friction engaging means towards both of said coacting surfaces, means adapted to hold said first member axially-stationary, said first member adapted to resist the action of said bias on said axially-movable friction engaging means to provide a drive at unit ratio, means arranged to allow axial movement of said second member, a fluid-pressure-operated means operable to move said second member axially into engagement with said axially-movable friction engaging means whereby to move said axially-movable friction engaging means against said bias to disengage said first coacting surface and to engage said second coacting surface to provide a drive at the planetary overdrive ratio, a fluid-pressure-operated baulking member operable to coact with said axially-movable friction engaging means to prevent the engagement of said axially-movable friction engaging member and said first coacting surface, a body defining an exhaust passage, a fluid-flow restrictor arranged in said exhaust passage, and valve means operable to connect said fluid-pressure-operated baulking member to said exhaust passage when said fluid-pressure-operated means is de-energised whereby to create a free-wheeling condition between said power input shaft and said power output shaft for a period before the initiation of engagement of unit ratio, and the fluid-flow characteristics of said fluid-flow restrictor determining the duration of said period to be such that said input shaft will accelerate said axially-movable friction engaging means to substantially the same speed as said first member before the initiation of engagement of unit ratio.

7. A planetary overdrive transmission device, for optionally providing a drive at unit or the planetary overdrive ratio, comprising a power input shaft, a power output shaft, an axially-movable friction engaging means, a sun wheel, an annulus wheel, a planet wheel, a planet carrier supporting said planet wheel, said planet wheel arranged to transmit drive between said sun wheel and said annulus wheel, driving means connecting said planet carrier to said power input shaft, driving means connecting said annulus wheel to said power output shaft, driving means connecting said sun wheel to said axially-movable friction engaging means, said annulus wheel defining a first coacting surface, an annular piston defining a second coacting surface, means arranged to prevent rotation of said annular piston, said axially-movable friction engaging means adapted optionally to engage said first coacting surface to provide a drive at unit ratio or to engage said second contacting surface to provide a rive at said planetary overdrive ratio, a bias arranged to urge said axially-movable friction engaging means toward both of said coacting surfaces, means adapted to hold said annulus wheel axially-stationary, said annulus wheel adapted to resist the action of said bias on said axially-movable friction engaging means to provide a drive at unit ratio, means arranged to allow axial movement of said annular piston, a fluid-pressure-operated means operable to move said annual piston axially into engagement with said axially-movable friction engaging means whereby to move said axially-movable friction engaging means against said bias to disengage said first coacting surface and to engage said second coacting surface to provide a drive at the planetary overdrive ratio, a fluid-pressure-operated baulking member operable to coact with said axially-movable friction engaging means to prevent the engagement of said axially-movable friction engaging means and said first coacting surface, a valve means, a body defining a first passage communicating with said fluid-pressure-operated means and a second passage communicating with said fluid-pressure-operated baulking member, said passages communicating with each other and with said valve means, and a one-way-acting fluid-flow restrictor arranged in said second passage, said valve means operable to connect said passages optionally to exhaust or to supply, and said one-way-acting restrictor arranged so that it will only restrict the exhaust of fluid from said second passage whereby, when said valve means is operated to de-energize said fluid-pressure-operated means, to create a free-wheeling condition between said power input shaft and said power output shaft for a period before the initiation of engagement of unit ratio, and the fluid-flow characteristics of said fluid-flow restrictor determining the duration of said period to be such that said input shaft will accelerate said axially-movable friction engaging means to substantially the same speed as said first member before the initiation of engagement of unit ratio.

8. A planetary underdrive transmission device, for optionally providing a drive at unit or the planetary underdrive ratio, comprising a power input shaft, a power output shaft, an axially-movable friction engaging means, a sun wheel element, an annulus wheel element, a planet wheel, a planet carrier element supporting said planet wheel, said planet wheel arranged to transmit drive between said sun wheel element and said annulus wheel element, driving means connecting one of said elements to said power input shaft, driving means connecting another of said elements to said power output shaft, driving means connecting the remaining said element to said axially-movable friction engaging means, said planet carrier element being one of said elements that is connected by said driving means to one of said shafts, a first member defining a first coacting surface, driving means connecting said first member to one of said shafts, a second member defining a second coacting surface, means arranged to prevent rotation of said second member, said axially-movable friction engaging means adapted optionally to engage said first coacting surface to provide a drive at unit ratio or to engage said second coacting surface to provide a drive at said planetary underdrive ratio, a bias arranged to urge said axially-movable friction engaging means towards both of said coacting surfaces, means adapted to hold said second member axially-stationary, said second member adapted to resist the action of said bias on said axially-movable friction engaging means to provide a drive at the planetary underdrive ratio, means arranged to allow axial movement of said first member, a fluid-pressure-operated means operable to move said first member axially into engagement with said axially-movable friction engaging means whereby to move said axially-movable friction engaging means against said bias to disengage said second coacting surface and to engage said first coacting surface to provide a drive at the unit ratio, a fluid-pressure-operated baulking member operable to coact with said axially-movable friction engaging means to prevent the engagement of said axially-movable friction engaging means and said second coacting surface, a body defining an exhaust passage, a fluid-flow restrictor arranged in said exhaust passage, and valve means operable to connect said fluid-pressure-operated baulking member to said exhaust passage when said fluid-pressure-operated means is de-energized whereby to create a free-wheeling condition between said power input shaft and said power output shaft for a period before the initiation of engagement of the planetary underdrive ratio, and the fluid-flow characteristics of said fluid-flow restrictor determining the duration of said period to be such that said input shaft will decelerate said axially-movable friction engaging means substantially to zero before the initiation of engagement of the planetary underdrive ratio.

References Cited in the file of this patent
UNITED STATES PATENTS

| | | |
|---|---|---|
| 2,136,971 | Fleischel | Nov. 15, 1938 |
| 2,550,373 | Ortloff et al. | April 24, 1951 |